United States Patent
Watakabe et al.

(10) Patent No.: US 7,470,749 B2
(45) Date of Patent: Dec. 30, 2008

(54) BLOCK POLYMER, PROCESS FOR PRODUCING A POLYMER, AND POLYMER ELECTROLYTE FUEL CELL

(75) Inventors: Atsushi Watakabe, Kanagawa (JP); Takeshi Eriguchi, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 298 days.

(21) Appl. No.: 11/244,002

(22) Filed: Oct. 6, 2005

(65) Prior Publication Data

US 2006/0029854 A1 Feb. 9, 2006

Related U.S. Application Data

(62) Division of application No. 10/430,339, filed on May 7, 2003, now abandoned, which is a division of application No. 09/782,020, filed on Feb. 14, 2001, now Pat. No. 6,610,789.

(30) Foreign Application Priority Data

Feb. 15, 2000 (JP) .............................. 2000-36941
Nov. 17, 2000 (JP) .............................. 2000-351817

(51) Int. Cl.
*C08F 14/18* (2006.01)
(52) U.S. Cl. .................. 525/276; 525/200; 526/247; 526/243; 526/255
(58) Field of Classification Search ............... 525/276, 525/200; 526/247, 243, 255
See application file for complete search history.

(56) References Cited

U.S. PATENT DOCUMENTS 4,361,678 A * 11/1982 Tatemoto et al. ............ 528/374
5,399,184 A 3/1995 Harada
6,087,032 A 7/2000 Yoshitake et al.
6,274,677 B1 8/2001 Tatemoto
2002/0142207 A1 10/2002 Watakabe et al.
2004/0230018 A1 11/2004 Okazoe et al.
2005/0037265 A1 2/2005 Watakabe
2005/0266291 A1 12/2005 Watakabe
2006/0029854 A1 2/2006 Watakabe et al.

FOREIGN PATENT DOCUMENTS

| EP | 0 345 964 | 12/1989 |
| EP | 1091435 | 4/2001 |
| JP | 11-329062 | 11/1999 |
| JP | 2000-188111 | 7/2000 |
| WO | WO 99/59216 | 11/1999 |

OTHER PUBLICATIONS

U.S. Appl. No. 11/311,560, filed Dec. 20, 2005, Watakabe et al.
U.S. Appl. No. 11/244,002, filed Oct. 6, 2005, Watakabe et al.
U.S. Appl. No. 11/183,748, filed Jul. 19, 2005, Tayanagi et al.

* cited by examiner

*Primary Examiner*—Randy Gulakowski
*Assistant Examiner*—Olga Asinovsky
(74) *Attorney, Agent, or Firm*—Oblon, Spivak, McClelland, Maier & Neustadt, P.C.

(57) ABSTRACT

A polymer electrolyte fuel cell comprising a membrane-form polymer electrolyte, a cathode disposed on one side of the polymer electrolyte, and an anode disposed on the other side of the polymer electrolyte, wherein the cathode comprises a catalyst and an ion exchange resin, and the ion exchange resin is made of a polymer comprising the following segments A and segments B:

Figure 1:
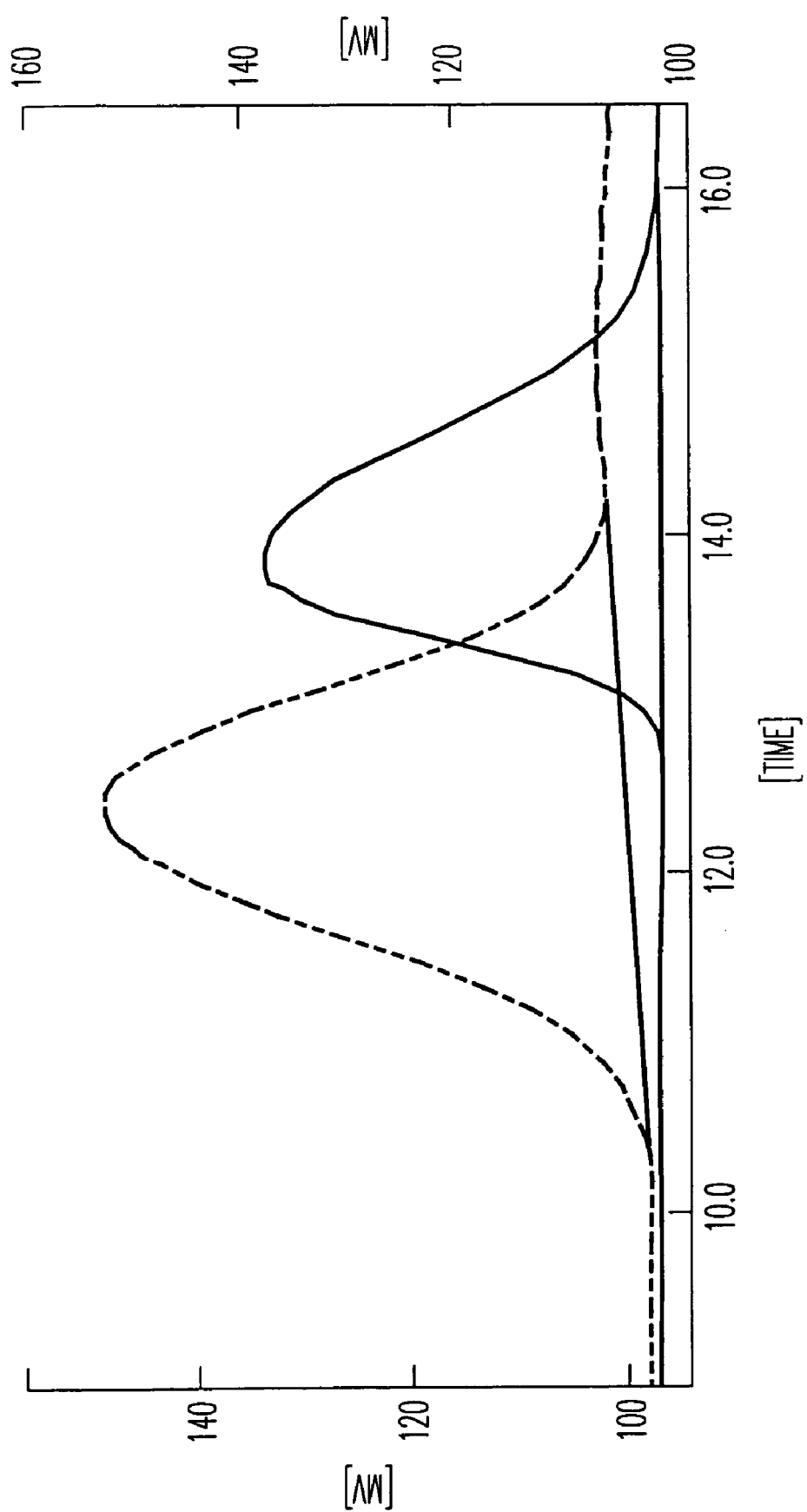

Segments A: segments made of a polymer having sulfonic acid groups; and

Segments B: segments made of a fluoropolymer having substantially no ion exchange groups.

9 Claims, 5 Drawing Sheets

BLOCK POLYMER, PROCESS FOR PRODUCING A POLYMER, AND POLYMER ELECTROLYTE FUEL CELL

This application is a divisional of U.S. application Ser. No. 10/430,339 (now abandoned, filed on May 7, 2003, which is a divisional of U.S. application Ser. No. 09/782,020 (now U.S. Pat. No. 6,610,789), filed on Feb. 14, 2001, which claims priority to JP 2000-36941, filed on Feb. 15, 2000, JP 2000-351817, filed on Nov. 17, 2000, and JP 2000-351619, filed on Nov. 17, 2000.

The present invention relates to a block polymer, a process for its production and a liquid composition containing the block polymer, as well as a polymer electrolyte fuel cell having an electrode containing the block polymer.

Attention has been drawn to a hydrogen/oxygen fuel cell as a power generation system which gives substantially no adverse effect to the global environment, since its reaction product is only water in principle. Polymer electrolyte fuel cells were once mounted on space ships in the Gemini Project and the Bio-satellite Project, but the cell output densities at that time were low. Thereafter, alkaline fuel cells having higher performance have been developed, and such alkaline fuel cells have been employed for space crafts including current space shuttles.

Whereas, along with the progress of technology in recent years, attention has been drawn again to polymer electrolyte fuel cells, for the following two reasons. (1) As a polymer electrolyte, a highly conductive membrane has been developed. (2) A catalyst to be used for a gas diffusion electrode layer is supported on carbon, and it is further coated with an ion exchange resin, whereby it has been made possible to obtain an extremely large activity.

And, many studies are being made on a process for producing a polymer electrolyte membrane/electrode assembly (hereinafter referred to simply as the assembly) for a polymer electrolyte fuel cell.

Polymer electrolyte fuel cells which are presently being studied, have an operation temperature as low as from 50 to 120° C. and thus have a drawback that waste heat can hardly be utilized, for example, as an auxiliary power for fuel cells. To offset such a drawback, it is desired that the polymer electrolyte fuel cells have particularly high output densities. Further, for practical applications, it is desired to develop an assembly whereby a high energy efficiency and a high output density can be obtained even under an operation condition where the fuel and air utilization rates are high.

Under an operation condition where the operation temperature is low and the gas utilization rate is high, clogging (flooding) of the electrode pore is likely to take place due to condensation of water-vapor at the cathode where water is formed by a cell reaction. Accordingly, in order to obtain a stable performance for a long period of time, it is necessary to secure water repellency of the electrode so as to prevent such flooding. This is particularly important in the case of a polymer electrolyte fuel cell whereby a high output density can be obtained at a low temperature.

In order to secure water repellency of an electrode, it is effective to reduce the ion exchange capacity of the ion exchange resin covering the catalyst in the electrode, i.e. to use an ion exchange resin having a low content of ion exchange groups. However, in such a case, the ion exchange resin has a low water content, whereby the electrical conductivity tends to be low, and the cell performance tends to be low. Further, the gas permeability of the ion exchange resin decreases, whereby supply of the gas to the catalyst surface through the coated ion exchange resin, tends to be slow. Accordingly, the gas concentration at the reaction site tends to be low, whereby the voltage loss tends to be large, i.e. the concentration overpotential tends to be high, whereby the output tends to decrease.

Therefore, it has been attempted to use a resin having a high ion exchange capacity as the ion exchange resin to cover the catalyst and further to incorporate to an electrode, particularly to a cathode, a fluorine resin such as polytetrafluoroethylene (hereinafter referred to as PTFE), a tetrafluoroethylene (hereinafter referred to as TFE)/hexafluoropropylene (hereinafter referred to as HFP) copolymer or a TFE/perfluoro(alkyl vinyl ether) copolymer, as a water repellent, thereby to suppress flooding (JP-A-5-36418). In this specification, an A/B copolymer represents a copolymer comprising repeating units based on A and repeating units based on B.

However, if the amount of the above water repellant in the electrode is increased in order to provide adequate water repellency, the electrical resistance of the electrode will increase as the above water repellent is an insulating material. Further, as the thickness of the electrode increases, the gas permeability decreases, thus leading to a problem that the output will decrease. To complement the decrease in the electrical conductivity of the electrode, it is, for example, necessary to increase the electrical conductivity of the carbon material as the carrier of the catalyst or to increase the ionic conductivity of the ion exchange resin covering the catalyst. However, it is difficult to obtain an electrode which satisfies adequate electrical conductivity and adequate water repellency at the same time, and it has not been easy to obtain a polymer electrolyte fuel cell which provides high output and which is stable for a long period of time.

Further, a method of mixing fluorinated pitch (JP-A-7-211324) or a method of subjecting a catalyst carrier to fluorination treatment (JP-A-7-192738) has also been proposed, but there has been a problem that the catalyst surface can not be uniformly covered by an ion exchange resin. Further, a method of letting the water repellency have a gradient in the thickness direction of the electrode, has been proposed (JP-A-5-251086, JP-A-7-134993), but the production method is cumbersome.

In order to solve such problems, the present inventors have studied the possibility of using for an electrode an ion exchange resin comprising segments containing sulfonic acid groups (—$SO_3H$ groups) and fluorine-containing segments having substantially no ion exchange groups. As one of such polymers, a block polymer may be mentioned, and as a method for its production, a method of employing iodine transfer polymerization is disclosed in JP-B-58-4728. Namely, disclosed is a method of polymerizing at least two radical-polymerizable monomers having unsaturated bonds by radical polymerization in the presence of an iodine compound having iodine atom(s), wherein in order to let at least two types of polymer chain segments form between the carbon-iodine bond of the above-mentioned iodine compound, the monomers to form the above-mentioned respective polymer chain segments, are sequentially polymerized to obtain a multi-segmented polymer.

And, as the monomers to form such segments, TFE and a monomer of the formula $CF_2=CFY'$ (wherein Y' is represented by —$(OCF_2)_\alpha$—$(OCF_2CF_2)_\beta$—$(OCF_2CF(CF_3))_\gamma$—Z, Z is $SO_2F$ or $SO_3M'$, M' is a hydrogen atom, a sodium atom or a potassium atom, and each of α, β and γ is an integer of from 0 to 3, provided that α+β+γ>0) are disclosed, and $CF_2=CFOCF_2CF(CF_3)OCF_2CF_2SO_2F$ is also exemplified. Further, WO98/43952 discloses that in the presence of $I(CF_2)_4I$, $CF_2=CF_2/CF_2=CFOCF_2CF_2SO_3Na$ copolymer segments (59/41 in molar ratio) are prepared by polymerization and then $CF_2=CF_2/CF_2=CFOC_3F_7$ segments are synthesized, to obtain a block polymer of ABA type having a heat absorption peak (a crystal melting point) at 275° C. as measured by a differential scanning calorimeter (DSC).

Such a polymer is disclosed to be excellent in e.g. electrical resistance or water resistance. However, the specifically disclosed block polymer has crystallinity, and it is difficult to control the polymerization, and such a block polymer can hardly be dissolved or dispersed in a solvent. Accordingly, in its application as a material for an electrode for a fuel cell, such a block polymer has a problem that it can hardly be formed into an electrode.

In order to increase the output of a fuel cell, the ion exchange resin in the electrode is required to be highly gas permeable and highly conductive, and an ion exchange resin having a high ion exchange group concentration and a high water content, is preferred. However, if an ion exchange resin having a high ion exchange group concentration is employed, flooding is likely to take place and the output tends to decrease when it is used for a long period of time, although the fuel gas permeability and conductivity will be high and the initial output of the fuel cell will be high.

Accordingly, it is an object of the present invention to provide a block copolymer which is useful as an electrode material for a fuel cell and which has a high water content and water repellency, a process for its production and a liquid composition containing such a block polymer, as well as a polymer electrolyte fuel cell employing such a block polymer.

The present invention provides a polymer electrolyte fuel cell comprising a membrane-form polymer electrolyte, a cathode disposed on one side of the polymer electrolyte, and an anode disposed on the other side of the polymer electrolyte, wherein the cathode comprises a catalyst and an ion exchange resin, and the ion exchange resin is made of a polymer comprising the following segments A and segments B:

Segments A: segments made of a polymer having sulfonic acid groups; and
Segments B: segments made of a fluoropolymer having substantially no ion exchange groups.

Further, the present invention provides a block polymer comprising the following segments C' and the following segments D and having a molecular weight of from $5\times10^3$ to $5\times10^6$.

The present invention also provides a block polymer comprising the following segments C' and the following segments E and having a molecular weight of from $5\times10^3$ to $5\times10^6$.

Segments C': segments made of a copolymer comprising repeating units based on a perfluorovinyl ether having a $-SO_2X$ group (wherein X is a fluorine atom, a chlorine atom or OM wherein M is a hydrogen atom, an alkali metal atom or $NR^1R^2R^3R^4$, wherein each of $R^1$, $R^2$, $R^3$ and $R^4$ which are independent of one another, is a hydrogen atom or a monovalent organic group) and repeating units based on tetrafluoroethylene, wherein the repeating units based on the perfluorovinyl ether are contained in an amount of at least 20 mol %;
Segments D: segments made of an amorphous perfluoropolymer having no ion exchange groups and having alicyclic structures in its main chain; and
Segments E: segments made of an amorphous copolymer having no ion exchange groups and comprising repeating units based on a perfluoro(alkyl vinyl ether) and repeating units based on tetrafluoroethylene, wherein the repeating units based on the perfluoro(alkyl vinyl ether) are contained in an amount of at least 20 mol %.

Further, the present invention provides a liquid composition which comprises an organic solvent having an alcoholic hydroxyl group and a block copolymer comprising the above-mentioned segments C' and the above-mentioned segments D, or a block copolymer comprising the above segments C' and the above segments E, dissolved or dispersed in the organic solvent.

Still further, the present invention provides a process for producing a polymer, which comprises polymerizing a first monomer group comprising one or more fluoromonomers in the presence of a first radical initiator and an iodine-containing fluoro-compound in a non-aqueous medium or in the absence of any solvent, to prepare a substantially amorphous polymer, and then, polymerizing a second monomer group comprising one or more monomers different from the first monomer group in the presence of the polymer and a second radical initiator in a non-aqueous medium or in the absence of any solvent.

Figure 2A:
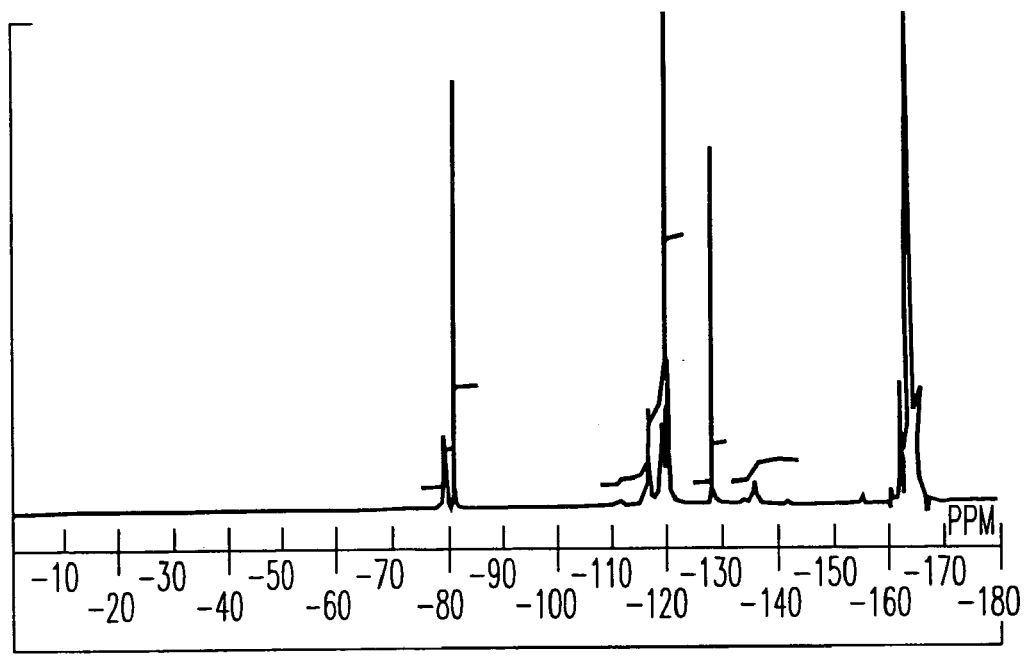
Figure 2B:
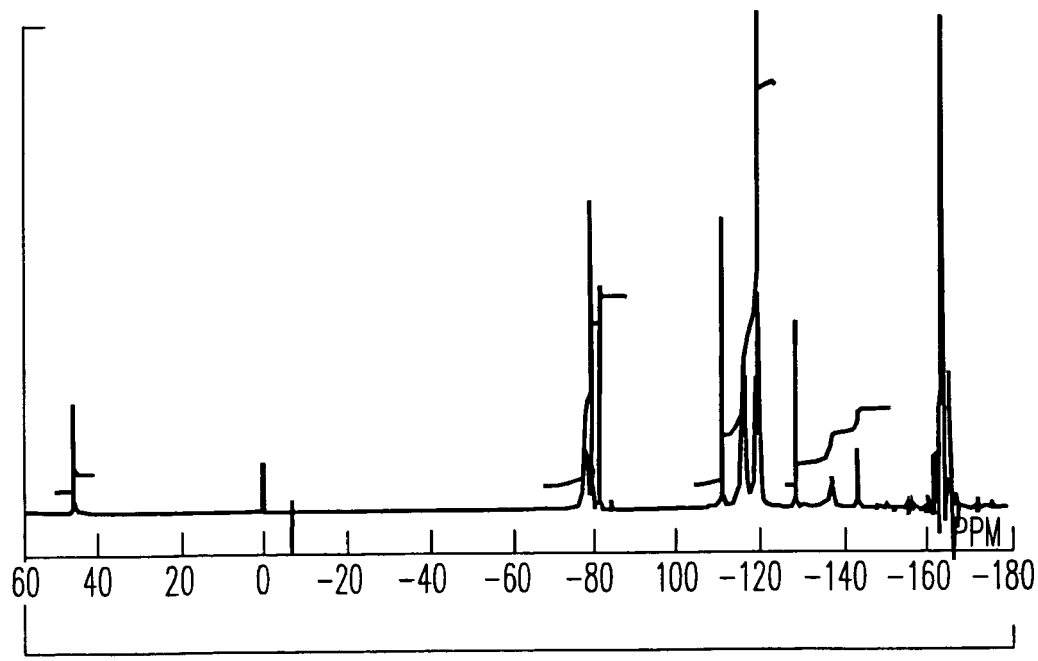
Figure 3A:
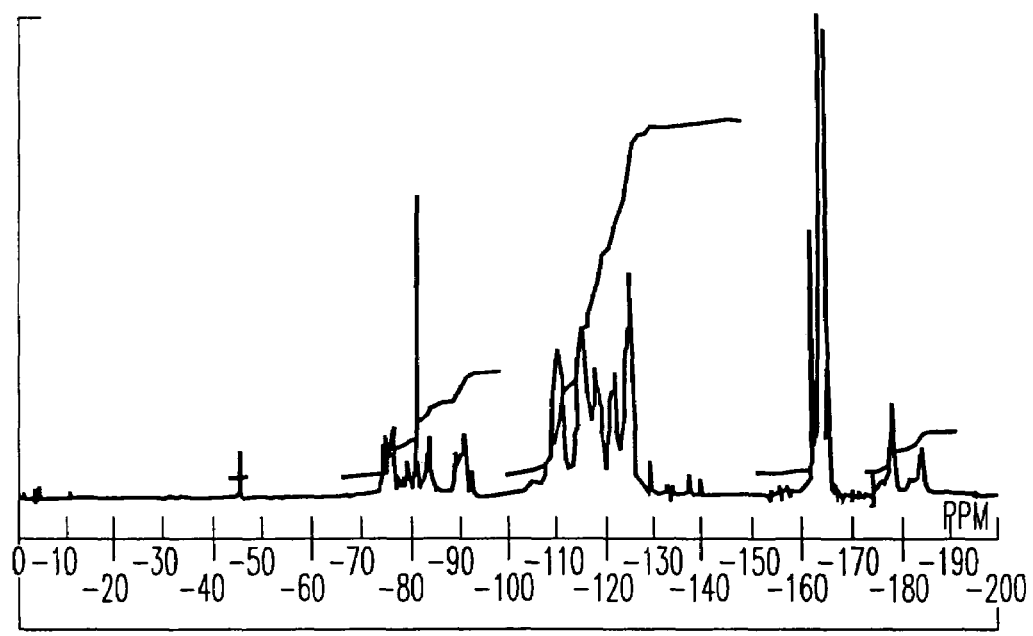
Figure 3B:
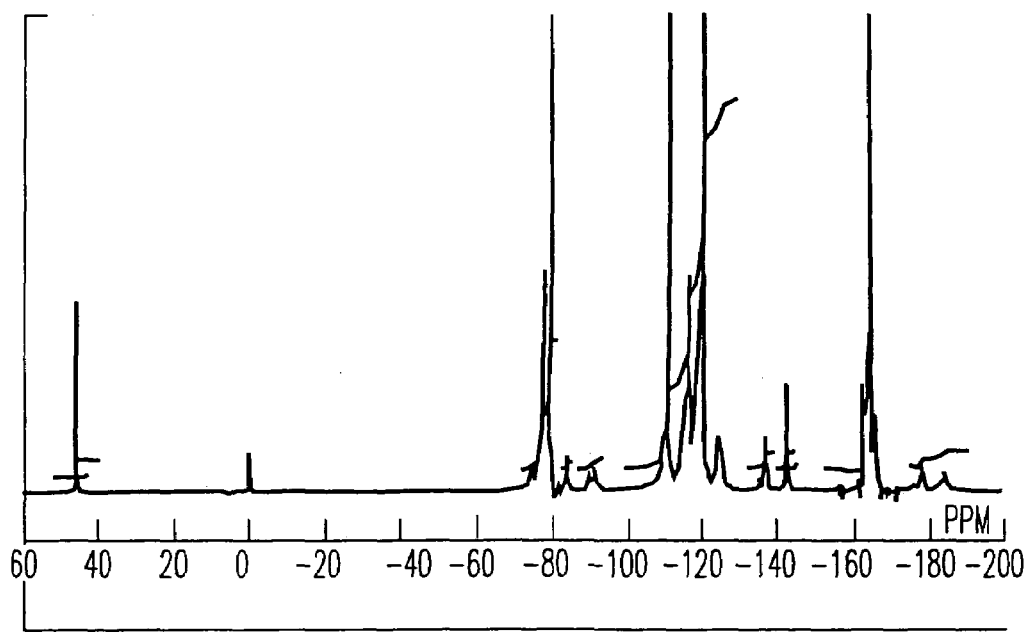
Figure 4A:
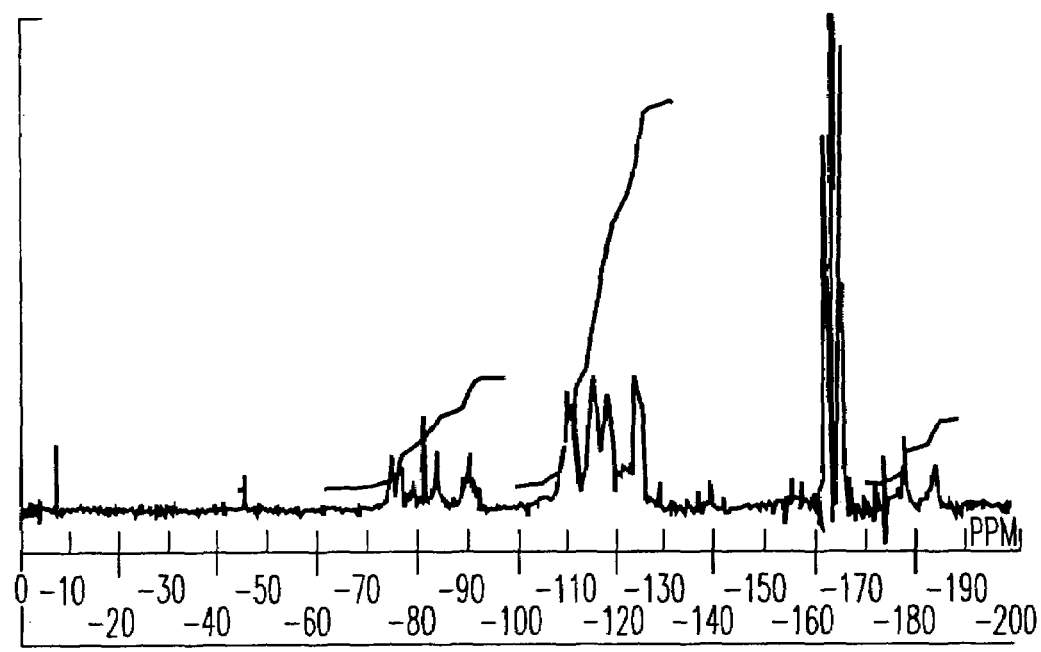
Figure 4B:
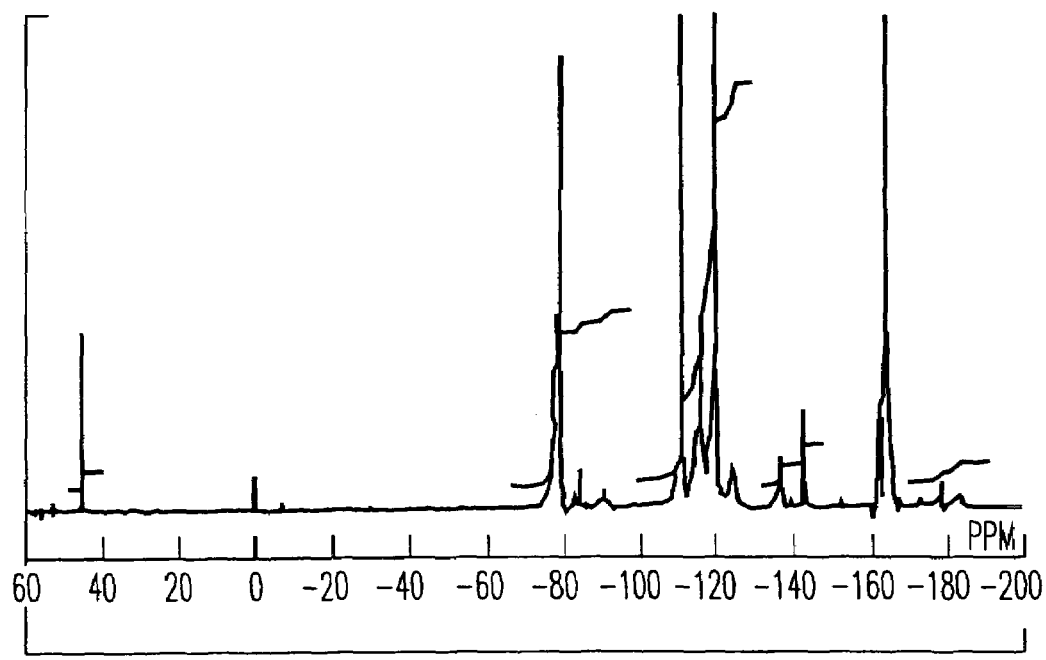
Figure 5A:
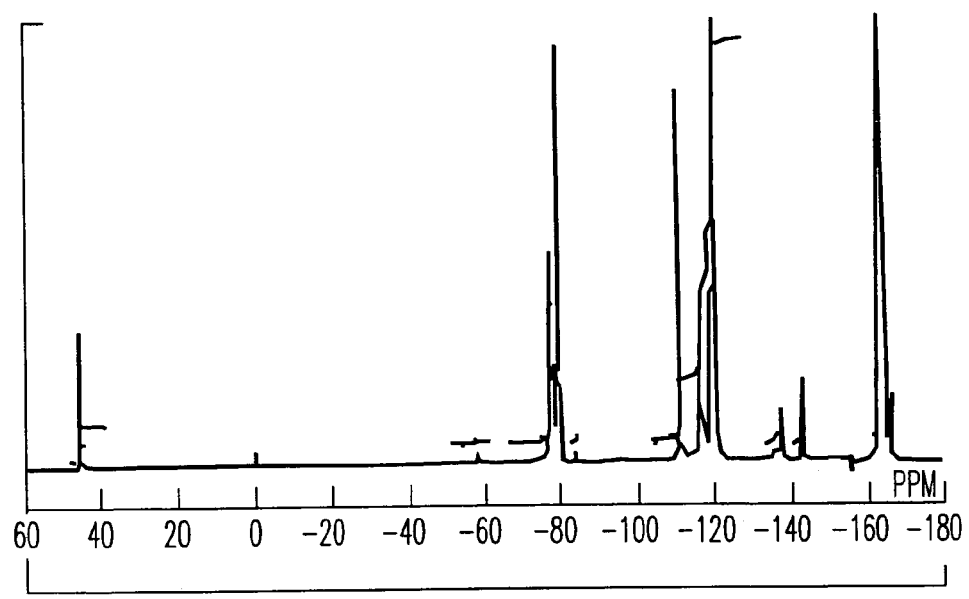
Figure 5B:
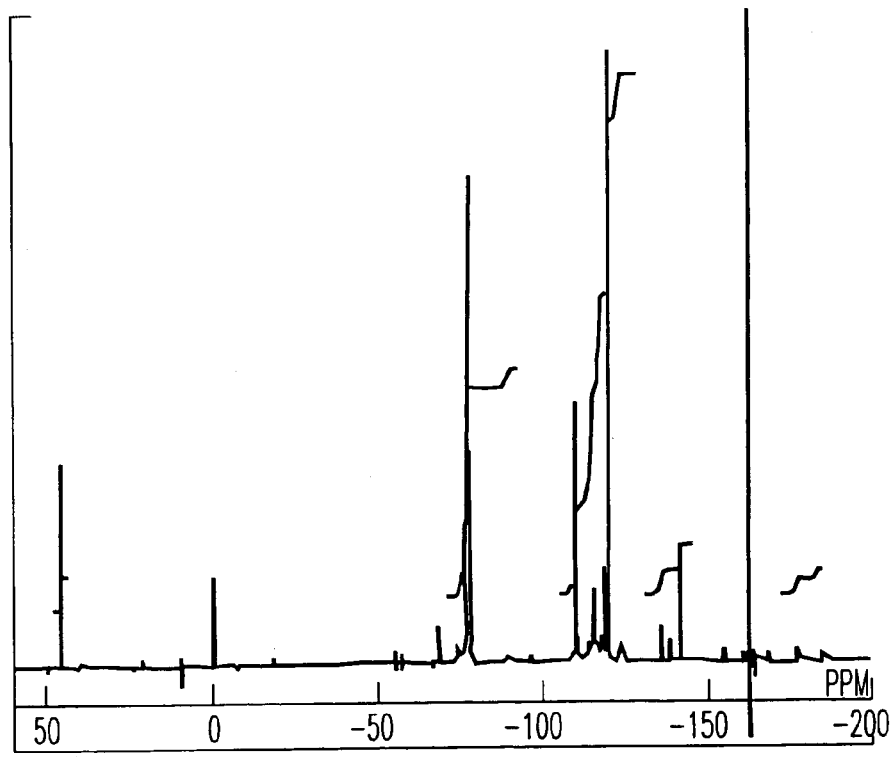

In the accompanying drawings:
FIG. 1 shows GPC charts of a TFE/PPVE copolymer and a block polymer prepared in Example 1.
FIG. 2(a) shows a $^{19}$F-NMR chart of a TFE/PPVE copolymer prepared in Example 1, and FIG. 2(b) shows a $^{19}$F-NMR chart of polymer 1 prepared in Example 1.
FIG. 3(a) shows a $^{19}$F-NMR chart of PBVE prepared in Example 2, and FIG. 3(b) shows a $^{19}$F-NMR chart of polymer 2 prepared in Example 2.
FIG. 4(a) shows a $^{19}$F-NMR chart of PBVE prepared in Example 3, and FIG. 4(b) shows a $^{19}$F-NMR chart of polymer 3 prepared in Example 3.
FIG. 5(a) shows a $^{19}$F-NMR chart of a TFE/PSVE copolymer prepared in Example 4, and FIG. 5(b) shows a $^{19}$F-NMR chart of polymer 4 prepared in Example 4.

Now, the present invention will be described in detail.
In the present invention, the ion exchange resin contained in a cathode (hereinafter referred to as the cathode resin) is preferably one obtained by hydrolyzing a block polymer comprising amorphous segments (hereinafter referred to as segments A') made of a polymer having fluorosulfonyl groups ($-SO_2F$ groups) and amorphous segments B and then converting it to an acid form. Here, both segments A' and segments B are amorphous, whereby it is easy to form multisegments by iodine transfer polymerization. If they have crystallinity, the iodine transfer polymerization tends to hardly proceed for such a reason that the reactivity of growing radicals deteriorates or a polymer precipitates from the solution. Especially when initially polymerized segments have crystallinity, it tends to be difficult to introduce the subsequently polymerized segments. Accordingly, they are preferably amorphous.

Further, an electrode for a polymer electrolyte fuel cell is formed usually by coating with a coating fluid prepared by dispersing a catalyst in a liquid having an ion exchange resin dissolved or dispersed in a solvent. If segments A' or segments B in the cathode resin in the present invention have crystallinity, the solubility or dispersibility of the resin in a solvent deteriorates, whereby it tends to be difficult to obtain an electrode having the ion exchange resin uniformly distributed, and the reactivity of the electrode tends to be low.

In this specification, an amorphous polymer is meant for a polymer having no crystal melting point $T_m$ or having a $T_m$ which is lower than the polymerization temperature.

In order for segments A' to be substantially amorphous, it is necessary that the repeating units based on a perfluorovinyl ether having a $-SO_2F$ group are contained in an amount of at least 20 mol %, particularly preferably at least 25 mol %, in the copolymer constituting segments A'. Further, in a case where segments A' contain repeating units based on a perfluoro(alkyl vinyl ether) having no —SO$_2$F group, the total amount of the repeating units based on a perfluorovinyl ether having a —SO$_2$F group and the repeating units based on the perfluoro(alkyl vinyl ether) is preferably at least 20 mol %, particularly preferably at least 25 mol %.

The cathode resin in the present invention comprises segments A and B. Both segments A and B are preferably made of polymers in which all hydrogen atoms are substituted by fluorine atoms (except for —SO$_2$X groups) (which will be referred to as perfluoropolymers in this specification) from the viewpoint of the practical durability of the fuel cell.

In order to increase the output of a fuel cell, it is preferred that the ion exchange resin in the electrode is highly gas permeable and highly conductive, and it is preferred that the ion exchange group concentration is high and the water content is high. For this purpose, segments A preferably have an ion exchange capacity of at least 0.5 meq/g dry resin. The polymer constituting segments A is a polymer comprising repeating units based on a monomer having a sulfonic acid group (a —SO$_3$H group) or one comprising such repeating units and repeating units based on other monomer, whereby the upper limit of the ion exchange capacity is determined by the ion exchange capacity of a homopolymer of the monomer having a sulfonic acid group or its precursor group and depends on the molecular weight of this monomer, and it is at a level of from 1.5 to 4 meq/g dry resin. Here, the precursor group of a sulfonic acid group is a group which becomes a sulfonic acid group by e.g. hydrolysis followed by acidification, and as defined for segments C', in this specification, the sulfonic acid group and its precursor group will be generally represented by a —SO$_2$X group.

As the monomer having a —SO$_2$X group as the starting material for the cathode resin, a perfluorovinyl ether having a —SO$_2$F group is preferred. Specifically, a perfluorovinyl ether compound of the formula CF$_2$=CF—(OCF$_2$CFY)$_m$—O$_p$—(CF$_2$)$_n$—SO$_2$F (wherein Y is a fluorine atom or a trifluoromethyl group, m is an integer of from 0 to 3, n is an integer of from 1 to 12, and p is 0 or 1) is preferred. Among such fluorovinyl ether compounds, a compound represented by one of the formulae 1 to 3 is preferred. In the formulae 1 to 3, q is an integer of from 1 to 8, r is an integer of from 1 to 8, and s is 2 or 3.

CF$_2$=CFO(CF$_2$)$_q$SO$_2$F　　　　　　　　Formula 1

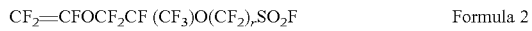

CF$_2$=CFOCF$_2$CF(CF$_3$)O(CF$_2$)$_r$SO$_2$F　　Formula 2

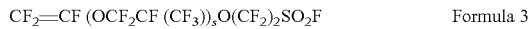

CF$_2$=CF(OCF$_2$CF(CF$_3$))$_s$O(CF$_2$)$_2$SO$_2$F　Formula 3

The perfluorovinyl ether having a —SO$_2$F group may be homo-polymerized, but it is usually copolymerized with a comonomer such as an olefin, since its radical polymerization reactivity is low. As such a comonomer, TFE is preferred. However, in addition to TFE, or instead of TFE, the following monomers may be copolymerized. Here, the following monomers may be added in an amount within such a range that the resulting segments will not substantially have crystallinity in the measurement of e.g. wide angle X-ray scattering, and if they are added, it is preferred that they are added so that the crystallinity of the obtainable segments would be at most 10%, preferably at most 5%, more preferably at most 2%. A preferred range of the amount of the perfluorovinyl ether having a —SO$_2$F group varies depending upon the monomer to be added, but it is usually at most 20 mol %, relative to TFE. Further, as the monomer to be added, one other than a perfluoromonomer may be employed, but from the viewpoint of the durability, it is preferred to use a perfluoromonomer.

Chlorotrifluoroethylene, trifluoroethylene, vinylidene fluoride, vinyl fluoride, ethylene, perfluoro(3-butenyl vinyl ether) (hereinafter referred to as BVE), perfluoro(allyl vinyl ether), perfluoro(2,2-dimethyl-1,3-dioxole) (hereinafter referred to as PDD), perfluoro(1,3-dioxole), perfluoro(2-methylene-4-methyl-1,3-dioxolane), perfluoro(3,5-dioxa-1,6-heptadiene), perfluoro(4-methoxy-1,3-dioxole), propylene, a perfluoro(α-olefin) such as hexafluoropropene, a (perfluoroalkyl)ethylene such as (perfluorobutyl)ethylene, a (perfluoroalkyl)propene such as 3-perfluorooctyl-1-propene, and a perfluoro(alkyl vinyl ether) (wherein the alkyl group may have a branched structure or may contain an oxygen atom of ether bond type, and an "alkyl group" will hereinafter be referred to in the same sense).

The perfluoro(alkyl vinyl ether) is preferably a perfluorovinyl ether compound of the formula CF$_2$=CF—(OCF$_2$CFZ)$_t$—O—R$^f$. In the formula, t is an integer of from 0 to 3, Z is a fluorine atom or a trifluoromethyl group, and R$^f$ is a linear or branched C$_{1-12}$ perfluoroalkyl group (hereinafter, in this specification, R$^f$ will be used in the same sense).

The perfluorovinyl ether compound of the formula CF$_2$=CF—(OCF$_2$CFZ)$_t$—O—R$^f$ is preferably a compound represented by one of the formulae 4 to 6. In the formulae 4 to 6, v is an integer of from 1 to 8, w is an integer of from 1 to 8, and x is 2 or 3.

CF$_2$=CFO(CF$_2$)$_v$CF$_3$　　　　　　　　Formula 4

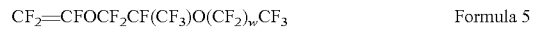

CF$_2$=CFOCF$_2$CF(CF$_3$)O(CF$_2$)$_w$CF$_3$　　Formula 5

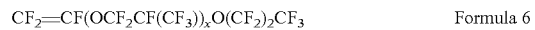

CF$_2$=CF(OCF$_2$CF(CF$_3$))$_x$O(CF$_2$)$_2$CF$_3$　Formula 6

Specifically, the segments A are preferably segments made of a copolymer of TFE/perfluorovinyl ether having a sulfonic acid group (segments C, provided that segments made of a copolymer having sulfonic acid groups or —SO$_2$X groups will be referred to as segments C'). The copolymer of TFE/perfluorovinyl ether having a sulfonic acid group may be crystalline or amorphous. To obtain an amorphous copolymer, it is necessary that the repeating units based on a perfluorovinyl ether having a sulfonic acid group are contained in an amount of at least 20 mol %, more preferably at most 25 mol %, in the copolymer.

On the other hand, the polymer constituting the segments B is a fluoropolymer having substantially no ion exchange groups, which is a homopolymer of a comonomer such as a fluoroolefin exemplified as a monomer to be copolymerized with the perfluorovinyl ether having a —SO$_2$F group in the segments A, or a copolymer of at least two types thereof, and it is preferably amorphous. Particularly preferred is segments (segments D) made of a perfluoropolymer having no ion exchange groups and having alicyclic structures in its main chain, such as a polymer obtainable by cyclopolymerization of a starting material or a polymer obtainable by polymerizing a cyclic monomer. If the ion exchange resin has segments D, its solubility in a solvent will be good.

Here, "having alicyclic structures in its main chain" means that at least one of carbon atoms in an alicyclic structure in a repeating unit is co-owned by the main chain of the polymer. Further, in this specification, "a polymer (or monomer) having no ion exchange group" neither has "a precursor of an ion exchange group" which can be converted to an ion exchange group by e.g. hydrolysis.

The following polymers may be mentioned as specific preferred examples of the polymer constituting the segments D.

A polymer obtainable by cyclopolymerization of a monomer as a starting material, such as a homopolymer of BVE (hereinafter referred to as PBVE), poly(perfluoro(allyl vinyl ether)) or poly(perfluoro(3,5-dioxa-1,6-heptadiene)), and a polymer obtainable by copolymerization of the above-mentioned cyclopolymerizable monomer with at least one other perfluoromonomer having no ion exchange groups.

A polymer obtainable by polymerization of a cyclic monomer, such as a homopolymer of PDD (hereinafter referred to as PPDD), poly(perfluoro(1,3-dioxole)), poly(perfluoro(2-methylene-4-methyl-1,3-dioxolane)) or poly(2,2,4-trifluoro-5-trifluoromethoxy-1,3-dioxole), and a polymer obtainable by copolymerization of the above-mentioned cyclic monomer with at least one other perfluoromonomer having no ion exchange groups, such as a TFE/PDD copolymer.

Here, both the above cyclic monomer and the above cyclopolymerizable monomer give amorphous segments, and therefore may be copolymerized at an optional ratio.

Said at least one perfluoromonomer having no ion exchange group, may, for example, be a perfluoro($\alpha$-olefin) such as TFE or hexafluoropropene, or a perfluoro(alkyl vinyl ether). Like the perfluoro(alkyl vinyl ether) which can be contained in the segments A, the above perfluoro(alkyl vinyl ether) is preferably a perfluorovinyl ether compound of the formula $CF_2=CF-(OCF_2CFZ)_t-O-R^f$, particularly a compound represented by one of the formulae 4 to 6.

Such a monomer can be copolymerized in an amount within a range not to impart crystallinity to the segments D. Specifically, in the case of TFE, it is preferably at most 50 mass % in the segments D. Other perfluoro($\alpha$-olefins) or perfluoro(alkyl vinyl ethers) have low polymerization reactivities although they present no crystallinity, and they are preferably at most 50 mass % in the segments D in order to increase the molecular weight of the segments D to a certain degree.

Further, as the polymer constituting the segments B, a linear fluoropolymer can also be preferably used. Specific examples of such a linear fluoropolymer include a TFE/hexafluoropropene copolymer, and a TFE/perfluoro(alkyl vinyl ether) copolymer. In a case where the cathode resin is prepared by an iodine transfer polymerization method, as mentioned above, it is preferred that the polymer constituting the respective segments is amorphous, and in a case where the above linear fluoropolymer contains repeating units based on TFE, the polymer can be made amorphous by increasing the content of the repeating units based on a comonomer to be copolymerized with TFE.

Here, the perfluoro(alkyl vinyl ether) is preferably $CF_2=CF-(OCF_2CFY)_n-O-R^f$. In the formula, Y is a fluorine atom or a trifluoromethyl group, and t is an integer of from 0 to 3. Compounds of the formulae 4 to 6 may be mentioned as preferred examples of the perfluorovinyl ether compound of the formula $CF_2=CF-(OCF_2CFY)_t-O-R^f$.

Among the linear fluoropolymers, the TFE/perfluoro(alkyl vinyl ether) copolymer is available as a crystalline one or an amorphous one. To obtain an amorphous one, it is necessary that the repeating units based on the perfluoro(alkyl vinyl ether) are contained in an amount of at least 20 mol %, more preferably at least 25 mol %, in the copolymer. Such segments made of an amorphous TFE/perfluoro(alkyl vinyl ether) copolymer containing at least 20 mol % of the repeating units based on the perfluoro(alkyl vinyl ether), are referred to as segments E in this specification. The perfluoro(alkyl vinyl ether) has a low polymerization reactivity, and it is preferably at most 50 mol % in order to increase the molecular weight of the segments E to a certain degree.

The cathode resin having the segments E is preferred since the solubility in a solvent is good. Further, the cathode comprising the cathode resin having the segments E is preferred since it is excellent in gas permeability.

The molecular weight of the cathode resin in the present invention is preferably from $5\times10^3$ to $5\times10^6$, particularly preferably from $1\times10^4$ to $3\times10^6$. Further, in the block polymer constituting the cathode resin, the ratio of the segments A to the segments B is preferably from 95/5 to 5/95, particularly preferably from 80/20 to 40/60, by mass ratio. Further, the molecular weight of each of the segments A and the segments B is preferably from $1\times10^3$ to $5\times10^6$, particularly preferably from $2\times10^3$ to $2\times10^6$. Here, in the case of a block polymer of ABA type, the molecular weight of the segments A is the molecular weight of the entire segments A, i.e. the molecular weight obtained by subtracting the molecular weight of the segments B from the molecular weight of the entire block polymer.

When the composition and the molecular weight are controlled as described above, phase separation between the segments A and the segments B is likely to take place, whereby good gas permeability, proton conductivity and water repellency can be secured. Further, when the block polymer is to be dissolved or dispersed in a solvent, if the molecular weight is too high, it tends to be difficult to dissolve or disperse it in a solvent.

In the process for producing a polymer of the present invention, the first monomer group is polymerized in the presence of a first radical initiator and a iodine-containing fluoro-compound in a non-aqueous medium or in the absence of any solvent, and then, the second monomer group is polymerized under similar conditions to the above in the presence of the obtained polymer and a second radical initiator. Here, the first radical initiator and the second radical initiator may be the same or different. Further, the first monomer group and the second monomer group respectively comprise one or more monomers, and the groups are different from each other.

The preferred polymer as the cathode resin in the present invention i.e. the block polymer of the present invention, is obtained by the above process. Namely, it is obtained by using the following monomer group c as the first monomer group and the following monomer group d, d' or e as the second monomer group, or using the following monomer group d, d' or e as the first monomer group and the following monomer group c as the second monomer group.

Monomer group c: a perfluorovinyl ether having a —$SO_2X'$ group (wherein X1 is a fluorine atom or a chlorine atom) and tetrafluoroethylene;

Monomer group d: a perfluoromonomer having no ion exchange groups and having an alicyclic structure, or a perfluoromonomer having no ion exchange groups and having an alicyclic structure and at least one other perfluoromonomer having no ion exchange groups;

Monomer group d': a perfluoromonomer having no ion exchange groups and having two double bonds and being capable of cyclopolymerization, or a perfluoromonomer having no ion exchange groups and having two double bonds and being capable of cyclopolymerization and at least one other perfluoromonomer having no ion exchange groups; and Monomer group e: a perfluoro(alkyl vinyl ether) having no ion exchange groups and tetrafluoroethylene.

Namely, the block polymer of the present invention can be obtained by introducing the segments C (or C') and the segments D or the segments E by the process for preparing a block polymer by iodine transfer polymerization. Namely, a monomer as a starting material for a polymer constituting the segments C (or C') or the segments D (or E) is polymerized in the presence of an iodine-containing fluoro-compound, and then a monomer as a starting material for the polymer constituting the other segments, is polymerized in the presence of the obtained polymer. At that time, as the monomer for the preparation of the segments A, it is preferred to use a monomer having a —SO$_2$F group or a —SO$_2$Cl group and to convert the —SO$_2$F group or the —SO$_2$Cl group to a sulfonic acid group after the polymerization.

In the case of the iodine transfer polymerization, the following compounds may, for example, be mentioned as the iodine-containing fluoro-compound to be used.

Iodoperfluoromethane, iodoperfluoroethane, 1-iodoperfluoropropane, 2-iodoperfluoropropane, 1-iodoperfluorobutane, 2-iodoperfluorobutane, 2-iodoperfluoroisobutane, 1-iodoperfluoropentane, 1-iodoperfluorohexane, 1-iodoperfluorooctane, 1-iodoperfluorononane, iodoperfluorocyclobutane, 2-iodoperfluoro(1-cyclobutyl)ethane, iodoperfluorocyclohexane, iododifluoromethane, iodofluoromethane, 2-iodo-1-hydroperfluoroethane, 3-iodo-1-hydroperfluoropropane, iodochlorodifluoromethane, iododichlorofluoromethane, 2-iodo-1,2-dichloro-1,1,2-trifluoroethane, 4-iodo-1,2-dichloroperfluorobutane, 6-iodo-1,2-dichloroperfluorohexane, 4-iodo-1,2,4-trichloroperfluorobutane, 1-iodo-2,2-dihydroperfluoropropane, 1-iodo-2-hydroperfluoropropane, iodotrifluoroethylene, 3-iodoperfluoropropene, 4-iodoperfluoro(1-pentene), and 4-iodo-5-chloroperfluoro(1-pentene).

1,3-diiodoperfluoropropane, 1,4-diiodoperfluorobutane, 1,3-diiodo-2-chloroperfluoropropane, 1,5-diiodo-2,4-dichloroperfluoropentane, 1,8-diiodoperfluorooctane, 1-iodoperfluorodecane, 1,12-diiodoperfluorododecane, 1,16-diiodoperfluorohexadecane, and 1,2-bis(iododifluoromethyl)perfluorocyclobutane.

2-iodo-1,1,1-trifluoroethane, 1-iodo-1-hydroperfluoropropane, 2-iodo-2,2-dichloro-1,1,1-trifluoroethane, 2-iodo-2-chloro-1,1,1-trifluoroethane, 2-iodoperfluoroethyl=perfluorovinyl=ether, 2-iodoperfluoroethyl=perfluoroisopropyl=ether, 3-iodo-2-chloroperfluorobutyl=perfluoromethyl=thioether, and 3-iodo-4-chloroperfluorobutyric acid.

A binary block polymer can be obtained by polymerizing a monomer as a starting material for the segments C' in the presence of the above-mentioned iodine-containing fluoro-compound, then removing the monomer remaining in the polymerization system out of the system, introducing a monomer as a starting material for the segments D or E into the system, followed by further polymerization. Further, a process for polymerizing a monomer as a starting material of the segments C' after polymerizing the segments D or E, can also be suitably employed. The perfluorovinyl ether compounds having —SO$_2$F groups as shown by the formulae 1 to 3 have low polymerization reactivities, whereby it is difficult to increase the conversion to polymers, and a large amount of monomers tend to remain in the system even after polymerization. Further, monomers, of which the boiling points are not high, can not easily be withdrawn from the polymerization system.

Accordingly, in order to synthesize subsequent segments without withdrawing the initially prepared segments from the polymerization system, firstly, a cyclopolymerizable monomer having a high polymerization reactivity, such as BVE, perfluoro(allyl vinyl ether) or perfluoro(3,5-dioxa-1,6-heptadiene), or a cyclic monomer such as PDD, perfluoro(1,3-dioxole), perfluoro(2-methylene-4-methyl-1,3-dioxolane) or perfluoro(4-methoxy-1,3-dioxole) is polymerized to form segments D, and in a later stage, a perfluorovinyl ether compound having a —SO$_2$F group is polymerized to form segments C', whereby a block polymer can easily be obtained.

Otherwise, firstly, segments D are prepared by using preferably a perfluoromonoiodide (one containing one iodine atom and all the rest of atoms bonding to carbon atoms being fluorine atoms except for the iodine atom and an oxygen atom), more preferably a perfluoroalkyl monoiodide, as an iodine compound in the iodine transfer polymerization, and then moieties of segments C' are prepared, whereby perfluoroalkyl groups can be introduced at the terminals of the segments D having no ion exchange groups, and a polymer having high water repellency can be obtained.

Substitution of a monomer remaining in the polymerization system by a monomer to be further polymerized and the polymerization can be repeated to obtain a multi-segmented polymer. At the time of the above-mentioned substitution of a monomer, the polymer having iodine atoms at the terminals may be isolated and again charged for the subsequent polymerization. Otherwise, without isolating the polymer, the monomer may be withdrawn out of the reaction system, and the monomer for the subsequent polymerization may then be added.

When the remaining monomer is a gaseous monomer or a monomer having a low boiling point, the latter method of withdrawing the remaining monomer may suitably be employed. In a case where a monomer having a high polymerization reactivity such as a cyclic monomer or a cyclopolymerizable monomer, is polymerized in the first stage, and the conversion from the monomer to the polymer is high, a monomer to be subsequently polymerized may be added to the system without withdrawing the remaining monomer after the polymerization, whereby a polymer substantially the same as in the case where the monomer of the first stage is withdrawn, can be obtained.

The polymerization is carried out under such a condition that radicals are formed. In the process of the present invention, polymerization is carried out in a non-aqueous medium or under a condition where no solvent is present. It is common to employ a method of irradiating radiation rays such as ultraviolet rays, y-rays or electron beams, or a method of adding a radical initiator which is commonly used in radical polymerization. In the Examples of the present invention, the latter method is employed. The polymerization temperature is usually at a level of from 20 to 150° C. The radical initiator may, for example, be a bis(fluoroacyl) peroxide, a bis(chlorofluoroacyl) peroxide, a dialkyl peroxydicarbonate, a diacyl peroxide, a peroxy ester or an azo compound.

In a case where polymerization is carried out in a non-aqueous medium, the boiling point of the solvent to be used is usually from 20 to 350° C., preferably from 40 to 1500C, from the viewpoint of handling efficiency. The following solvents may, for example, be mentioned as useful solvents.

A polyfluorotrialkylamine compound such as perfluorotributylamine or perfluorotripropylamine.

A fluoroalkane such as perfluorohexane, perfluorooctane, perfluorodecane, perfluorododecane, perfluoro(2,7-dimethyloctane), 2H,3H-pentafluoropentane, 1H-perfluorohexane, 1H-perfluorooctane, 1H-perfluorodecane, 1H,4H-perfluorobutane, 1H,1H,1H,2H,2H-perfluorohexane, 1H,1H,1H,2H,2H-perfluorooctane, 1H,1H,1H,2H,2H-perfluorodecane, 3H,4H-perfluoro(2-methylpentane) or 2H,3H-perfluoro(2-methylpentane).

A chlorofluoroalkane such as 3,3-dichloro-1,1,1,2,2-pentafluoropropane, 1,3-dichloro-1,1,2,2,3-pentafluoropropane, or 1,1-dichloro-1-fluoroethane.

A fluoroolefin having no double bond at the molecular terminal, such as a dimer of hexafluoropropene or a trimer of hexafluoropropene.

A polyfluorocycloalkane such as perfluorodecalin, perfluorocyclohexane, perfluoro(1,2-dimethylcyclohexane), perfluoro(1,3-dimethylcyclohexane), perfluoro(1,3,5-trimethylcyclohexane) or perfluoro(dimethylcyclobutane) (the structural isomerism is not limited).

A perfluorocyclic ether compound such as perfluoro(2-butyltetrahydrofuran).

A hydrofluoroether such as $n\text{-}C_3F_7OCH_3$, $n\text{-}C_3F_7OCH_2CF_3$, $n\text{-}C_3F_7OCHFCF_3$, $n\text{-}C_3F_7OC_2H_5$, $n\text{-}_4F_9OCH_3$, $iso\text{-}C_4F_9OCH_3$, $n\text{-}C_4F_9OC_2H_5$, $iso\text{-}C_4F_9OC_2H_5$, $n\text{-}C_4F_9OCH_2CF_3$, $n\text{-}C_5F_{11}OCH_3$, $n\text{-}C_6F_{13}OCH_3$, $n\text{-}C_5F_{11}OC_2H_5$, $CF_3OCF(CF_3)CF_2OCH_3$, $CF_3OCHFCH_2OCH_3$, $CF_3OCHFCH_2OC_2H_5$ or $n\text{-}C_3F_7OCF(CF_3)CF_2OCHFCF_3$, a fluorine-containing lower molecular weight polyether, or t-butanol.

These solvents may be used alone or as a mixture of two or more of them. Other than these solvents, a wide range of compounds may be used as solvents. Chlorofluorocarbons such as 1,1,2-trichloro-1,2,2-trifluoroethane, 1,1,1-trichloro-2,2,2-trifluoroethane, 1,1,1,3-tetrachloro-2,2,3,3-tetrafluoropropane and 1,1,3,4-tetrachloro-1,2,2,3,4,4-hexafluorobutane, can be used technically, but they are not preferred from the viewpoint of the protection of the global environment. Further, polymerization can be carried out by means of liquefied or supercritical carbon dioxide.

In the case of suspension polymerization or emulsion polymerization, polymerization can be carried out in water or in a mixed system of water with the above-mentioned solvent. However, in the process of the present invention, a polymer is obtained by polymerization in the above-described non-aqueous medium or by bulk polymerization (polymerization in the absence of a solvent). The reason for employing such a polymerization method in the present invention is as follows.

In the suspension polymerization, polymer particles swelled with the monomer during polymerization are likely to bond one another to form large agglomerates, whereby it is difficult to realize a smooth process. On the other hand, in the emulsion polymerization, it is difficult to control the polymer properties. For example, in a case where the segments A are made of a $TFE/CF_2=CFOCF_2CF(CF_3)OCF_2CF_2SO_3H$ copolymer, it is not easy to obtain segments A having a high ion exchange capacity by a usual emulsion polymerization method employing an emulsifier such as $C_7F_{15}CO_2NH_4$ or $C_8F_{17}CO_2NH_4$ (the structural isomerism is not limited) which is commonly used in emulsion polymerization of a fluoropolymer.

For example, polymerization is carried out at 57° C. by adding 20 parts by mass of $CF_2=CFOCF_2CF(CF_3)OCF_2CF_2SO_2F$ and 0.2 part by mass of $n\text{-}COF_{17}CO_2NH_4$ as an emulsifier, per 100 parts by mass of water, only a polymer having an ion exchange capacity of not higher than 0.2 meq/g dry resin will be obtained under a polymerization pressure of TFE being as low as 0.2 MPa by gauge pressure. This is considered to be attributable to the fact that emulsification of the above vinyl ether monomer having a $—SO_2F$ group is difficult, whereby the above vinyl ether monomer can not be supplied smoothly from monomer drops to the micelle at the polymerization site. Accordingly, in order to obtain a polymer having a high ion exchange capacity by a conventional method, it is necessary to lower the TFE concentration in the polymerization system by further lowering the polymerization pressure, but such is not preferred since the dependency of the ion exchange capacity of the resulting polymer on the polymerization pressure tends to be too much, and the polymer properties of the polymer such as the ion exchange capacity and the molecular weight tend to be substantially changed by a small change in pressure. As a method to solve such a problem, there has been proposed a method of carrying out preliminary emulsification by means of ultrasonic waves or an emulsifying apparatus (JP-A-60-250009, JP-A-62-288617) or a method of employing a special emulsifier such as an emulsifier having a long alkyl chain, an emulsifier having an ether chain or an emulsifier having a sulfonate-type functional group (JP-A-62-288614, JP-A-62-288615, JP-A-62-288616). However, the method of carrying out preliminary emulsification has a problem in the reproducibility, since the polymer properties are sensitive to the conditions for the preliminary emulsification. The method of employing the special emulsifier has a problem such that it is difficult to obtain it, or the cost tends to be high. A method of adding a water-soluble organic solvent such as t-butanol to the polymerization system, has also been proposed (JP-A-6-184244), but it has a problem with respect to waste water treatment.

Further, in order to carry out emulsion polymerization with good reproducibility to obtain a polymer having a high ion exchange capacity, it is necessary that even at a later stage of the polymerization, a large amount of the vinyl ether monomer having a $—SO_2F$ group, is present, whereby the conversion of the vinyl ether monomer can not be increased. Accordingly, a process for recovering the monomer after the polymerization will be required.

In the polymerization in a non-aqueous medium or in the bulk polymerization, the monomer can easily be recovered as follows. Namely, it is possible to employ a method of distilling a liquid obtained by coagulating the polymer and washing it, followed by filtration or a liquid obtained by centrifugal separation, or a method of recovering the monomer by heating the solution or slurry after the polymerization to distill the monomer/solvent under a reduced pressure. On the other hand, in a case of recovering the monomer from a latex obtained by emulsion polymerization, if it is attempted to recover the monomer by coagulating the polymer, the coagulated polymer is swelled with the monomer and difficult to handle as it is highly viscous.

Further, if stirring is carried out in a state where water, the fluoromonomer and/or the fluorine-containing solvent and the fluoropolymer, are co-existent, a liquid product of suspension state is likely to form, and their separation tends to be difficult. Further, in the co-existence of water and the monomer, hydrofluoric acid is likely to form as a by-product, whereby there will be a problem that the apparatus is likely to be corroded. The same problem will result also in a method of recovering the monomer under reduced pressure or in a method of recovering the monomer by washing with a solvent when water is co-existent. A method of adding a certain specific fluorine-containing solvent to the latex to extract and recover the monomer, is available, but there will be a problem such that the latex will be destroyed during the extraction, or the extracting solvent will be absorbed by the latex to some extent.

Further, in the emulsion polymerization, a micelle will be present other than the micelle in which the polymer is formed. Accordingly, if the subsequent polymerization starts in a micelle which does not contain segments initially polymerized, a polymer blend (a mixture of a polymer constituting segments A or their precursor and a polymer constituting segments B) is likely to be formed instead of a block polymer.

Whereas, by polymerization in a non-aqueous medium having high affinity to the polymer or by bulk polymerization, the polymerization reactivities of the growing terminals of the polymer will be maintained, whereby the above-mentioned problems will not occur. In a case where the initially prepared segments have no crystallinity, the initially prepared segments can be uniformly dissolved in the above non-aqueous medium or the monomer in the subsequent polymerization, whereby the reaction for block polymerization can be proceeded smoothly. Further, even when the initially polymerized segments are not completely dissolved, they will be sufficiently swelled, whereby the reactivity of the growing terminals by polymerization can be secured, whereby the reaction for block polymerization can be proceeded. Here, if initially crystallized segments are subjected to polymerization, in the subsequent polymerization, the reaction for block polymerization tends to be hardly smoothly proceeded, such being undesirable.

The —$SO_2F$ groups in the polymer thus prepared, will be converted to —$SO_3Na$ groups or —$SO_3K$ groups, when they are hydrolyzed in water or a solvent mixture of water with a polar solvent such as dimethylsulfoxide or an alcohol such as methanol or ethanol, containing an alkali such as NaOH or KOH. Further, if they are treated with an acidic aqueous solution of e.g. hydrochloric acid, sulfuric acid or nitric acid, they will be converted to an acid form, whereby Na ions or K ions are substituted by protons to form sulfonic acid groups (—$SO_3H$ groups) The hydrolysis and conversion to the acid form are carried out usually at a temperature of from 0 to 120° C.

Here, the process for preparing a block polymer of the present invention has been described with reference to a case wherein segments A are prepared from a monomer having a —$SO_2F$ group. However, the preparation may be carried out in the same manner when the block polymer is prepared from a monomer having a —$SO_2Cl$ group, and, for example, when the polymer is to be used for a polymer electrolyte fuel cell, such a group is converted to a sulfonic acid group before use.

The block polymer of the present invention has amorphous segments D or segments E having no ion exchange groups and has no crystallinity, whereby X in the —$SO_2X$ group is represented by —OM, and when M is a hydrogen atom, an alkali metal atom or $NH_4$, it can be dissolved or well dispersed in an organic solvent having a —OH group, particularly in an organic solvent having an alcoholic hydroxyl group. Further, also a block polymer wherein the —$SO_2X$ groups in the block polymer of the present invention are substituted by —$SO_3NR^1R^2R^3R^4$ groups wherein each of $R^1$, $R^2$, $R^3$ and $R^4$ which are independent of one another, is a hydrogen atom or a $C_{1-5}$ alkyl group (provided that at least one of $R^1$ to $R^4$ is not a hydrogen atom), can be dissolved and well dispersed in an organic solvent having a —OH group.

Such a solvent may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol. Further, other than an alcohol, an organic solvent having a carboxylic group, such as acetic acid, may be used.

However, the solvent is not limited to such a specific example.

Such organic solvents having —OH groups may be used in admixture or may be used as mixed with water or other fluorine-containing solvents. As such other fluorine-containing solvents, fluorine-containing solvents as exemplified as the preferred fluorine-containing solvents for polymerization in the above-mentioned non-aqueous solvent, may be exemplified. When a solvent mixture is to be employed, the organic solvent having a —OH group is preferably contained in an amount of at least 10%, particularly preferably at least 20%, based on the total mass of the solvents.

When a solvent mixture is to be employed, the block polymer may be dissolved or dispersed in the solvent mixture from the beginning, but it may be dissolved first in an organic solvent having a —OH group and then the other solvent may be mixed thereto.

Further, the block polymer of the present invention is hardly soluble in water. However, if it is dissolved in an organic solvent having a —OH group, water may be added to the obtained solution without precipitation of the polymer. It is considered that the ion exchange groups interact with the solvent, so that the polymer can be present in the liquid in a stabilized state. Further, by an operation of distillation under heating of the organic solvent having a —OH group and addition of water, or by an operation of repeating concentration of the polymer by a centrifugal separator and addition of water, it is also possible to prepare an aqueous dispersion of the polymer containing substantially no organic solvent. Dissolution of the block polymer of the present invention is carried out usually at a temperature of from room temperature to 150° C.

When an electrode for a polymer electrolyte fuel cell is prepared by using a liquid composition obtained by dissolving or dispersing the block polymer in water or a solvent containing the above-mentioned organic solvent having a —OH group, it is possible to obtain a gas diffusion electrode excellent in a gas diffusion property. Especially when the obtained electrode is used as a cathode, it is excellent in the oxygen gas permeability and is thus preferred. The concentration of the block polymer in such a liquid composition is preferably from 1 to 50%, particularly preferably from 3 to 30%, based on the total mass of the liquid composition. If the concentration is too low, a large amount of an organic solvent will be required at the time of preparing the electrode, and if the concentration is too high, the viscosity of the liquid tends to be too high, and the handling efficiency tends to be poor.

A conventional method may be employed for the preparation of an electrode for a polymer electrolyte fuel cell by using a solution or dispersion of the cathode resin in the present invention, such as the above liquid composition. Namely, it is preferred that conductive carbon black powder having fine particles of a platinum catalyst carried, is mixed and dispersed in the above solution or dispersion, and using the obtained uniform dispersion, a membrane/electrode assembly is obtained by either one of the following two methods. The first method is a method wherein the above-mentioned dispersion is coated on both sides of a cation exchange membrane and dried, and then a carbon cloth or carbon paper is adhered thereto. The second method is a method wherein the above dispersion is coated on a carbon cloth or carbon paper and then dried, and then adhered to a cation exchange membrane.

In the present invention, the catalyst contained in the cathode and the cathode resin are preferably in a weight ratio of catalyst/cathode resin of from 40/60 to 95/5, from the viewpoint of the electrical conductivity of the electrode and the dischargeability of water. Here, in the case of a catalyst supported on a carrier such as carbon, the mass of the catalyst includes the mass of the carrier.

Further, the cathode resin in the present invention may be composed of a single resin having segments A and segments B, but it may be a mixture thereof with a conventional perfluoropolymer having sulfonic acid groups. Such a polymer may, for example, be a polymer obtained by hydrolyzing a monomer represented by any one of the formulae 1 to 3/TFE copolymer or a monomer represented by any one of the formulae 1 to 3/TFE/a monomer represented by any one of the formulae 4 to 6 terpolymer, followed by conversion to an acid form. In the case of a mixture, the proportion of the resin having segments A and segments B is preferably at least 20%, particularly preferably at least 50%, based on the total mass of the cathode resin.

The cathode resin in the present invention comprises preferably segments A and segments B, particularly preferably segments C and segments D. However, it may comprise segments C, segments D and segments E. Namely, it may comprise at least two types of segments A and/or at least two types of segments B. Further, the cathode resin in the present invention may comprise at least two segments A or segments B, and it may be of an AB type, an ABA type, a BAB type, an ABAB type . . . (A and B represent segment A and segment B, respectively). Further, other segments may be contained in an amount of not more than 30 mass % within a range not to impair the function of ion conductivity by segments A or water repellency by segments B. Such other segments may, for example, be segments made of a polymer having carboxylic groups, segments made of a polymer having phosphoric groups or segments made of a polymer having hydroxyl groups.

The anode in the present invention may be the same as the cathode. However, it may be made of a gas diffusion electrode which has heretofore been commonly used. The anode is formed in the same manner as the cathode, and a membrane/electrode assembly is obtainable wherein an anode is disposed on one side of a membrane and a cathode is disposed on the other side of the membrane. The obtained membrane/electrode assembly may, for example, be sandwiched between separators made of e.g. conductive carbon plates having grooves formed for passage of a fuel gas or an oxidizing gas containing oxygen (such as air, oxygen, etc.) and assembled into a cell to obtain a polymer electrolyte fuel cell of the present invention.

Further, the block polymer of the present invention may be formed into a molded product such as a film by melt molding such as extrusion molding. For example, in the case of a block polymer having —$SO_2F$ groups, it is preferred that the glass transition temperatures $T_g$ or the crystalline melting points $T_m$ (if segments having a crystalline melting point are present) of the respective segments are at most 270° C. in order to carry out the melt molding without thermal decomposition of the —$SO_2F$ groups. The thermal decomposition of the —$SO_2F$ groups becomes remarkable at a temperature of 350° C. or higher, but in a case where the retention time in the molding machine is long, the decomposition takes place even at a lower temperature. On the other hand, in order to secure the melt fluidity, it is necessary to carry out molding at a temperature higher by at least from 30 to 400C than $T_g$ or $T_m$. Accordingly, in order to secure a temperature at which melt molding can be carried out under a stabilized condition, $T_g$ or $T_m$ is preferably at most 270° C. Here, in a case where $T_g$ or $T_m$ exists in plurality, all $T_g$ or all $T_m$ is preferably at most 270° C.

Usually, in a case where the respective segments of a block polymer are mutually insoluble, such a block polymer has a plurality of $T_g$ based on the respective segments, and in a case where compatibility of the respective segments is good, such a block polymer has one $T_g$ at a temperature between $T_g$ of the respective segments ("Mechanical properties of polymers and composites" by L. E. Nielsen, translated by Shigeharu Onoki, first edition, seventh printing, pp. 129-133, Kabushiki Kaisha Kagaku Dojin (1976)). Specifically, $T_g$ of preferred polymers constituting the respective segments of the block polymer of the present invention is as follows. $T_g$ of a copolymer comprising at least 20 mol % of repeating units based on $CF_2$=$CFOCF_2CF(CF_3)OCF_2CF_2SO_2F$ (hereinafter referred to as PSVE): lower than 100° C., $T_g$ of PBVE: 108° C., $T_g$ of poly(perfluoro(allyl vinyl ether)): 69° C., $T_g$ of poly(perfluoro(3,5-dioxa-1,6-heptadiene)): 78° C., $T_g$ of poly(perfluoro(2-methylene-4-methyl-1,3-dioxolane)): 130° C., $T_g$ of poly(perfluoro(1,3-dioxole)): 180° C., $T_g$ of poly(perfluoro (4-methoxy-1,3-dioxole)): 162° C., $T_g$ of a TFE/PDD copolymer (molar ratio: 35:65): 160° C., and $T_g$ of a TFE/PDD copolymer (molar ratio: 13:87): 240° C. Thus, a block polymer constituted solely by segments made of polymers having $T_g$ of lower than 270° C., as mentioned above, will not have $T_g$ exceeding 270° C., irrespective of the compatibility of the respective segments. Accordingly, such a block polymer can easily be melt-molded.

Further, for example, $T_g$ of PPDD is 335° C., but its compatibility with a TFE/PSVE copolymer is good, and accordingly, a block polymer comprising segments made of PPDD and segments made of a TFE/PSVE copolymer, can be controlled to have $T_g$ of at most 270° C. However, if this block polymer is hydrolyzed, the respective segments will be mutually insoluble.

Now, the present invention will be described in further detail with reference to Examples (Examples 1 to 5) and Comparative Example (Example 6), but it should be understood that the present invention is by no means restricted to such specific Examples.

In the following Examples, the following abbreviations will be used.

PPVE: $CF_2$=$CFOCF_2CF_2CF_3$,
IPP: $(CH_3)_2CHOC(=O)OC(=O)OCH(CH_3)_2$,
HCFC141b: $CH_3CCl_2F$,
HCFC225cb: $CClF_2CF_2CHClF$.

In the block polymer of AB type, ABA type or BAB type (A and B represent segment A and segment B, respectively) prepared in each of the following Examples, the molecular weights and the ion exchange capacities of the respective segments and the entire polymer were obtained as follows. The properties of the polymer of each Example obtained in such a manner are shown in Table 1. Here, the molecular weight of segments A of an ABA type block polymer represents the molecular weight of the total of segments A introduced into the polymer chain (the molecular weight obtained by subtracting the molecular weight of segments B from the molecular weight of the entire block polymer). The same applies with respect to a BAB type.

In Tables 1 and 2, the unit for the ion exchange capacity is meq/g dry resin. Further, in Table 1, A and B represent segment A and segment B, respectively.

Case Where Segments A are Prepared Firstly

With respect to the firstly prepared segments A, the ion exchange capacity was obtained by titration, and the number average molecular weight calculated as polymethyl methacrylate was obtained by a size exclusion chromatography (hereinafter referred to as GPC) (apparatus: SEC HLC-8020, manufactured by TOSOH CORPORATION, mobile phase: HCFC225cb/1,1,1,3,3,3-hexafluoro-2-propanol (volume ratio of 99/1), column: Plgel 5µ MIXED-C two columns, manufactured by Polymer Laboratory Co.). Then, the ion exchange capacity of the entire block polymer containing segments B, obtained by block copolymerization was obtained by titration. From the ion exchange capacity of the segments A and the ion exchange capacity of the entire block polymer, the mass ratio of the segments B to the segments A was obtained, and the molecular weight of the segments B was calculated. Further, using the above-mentioned molecular weight of the segments A, the molecular weight of the entire block polymer was calculated.

Case Where Segments B are Prepared Firstly

From the ion exchange capacity of the entire block polymer obtained by block copolymerization and the ion exchange capacity of the segments A obtained by the $^{19}$F-NMR (solvent: perfluorobenzene, standard material: CCl$_3$F, δ (ppm)), the mass ratio of the segments B to the segments A was obtained. In the same manner as described above, using the molecular weight of the segments B obtained by GPC, the molecular weight of the segments A and the molecular weight of the entire block polymer were calculated.

Now, Preparation Examples of block polymers will be described, and the ion exchange capacities and the molecular weights of the obtained polymers will be shown in Table 1.

EXAMPLE 1

Preparation of a (TFE/PPVE copolymer)-(TFE/PSVE Copolymer) Block Copolymer

Synthesis of TFE/PPVE Copolymer Segments

Into a degassed autoclave having an internal capacity of 1 l, 4.50 g of 1-iodoperfluorobutane (F(CF$_2$)$_4$I) and 706.5 g of PPVE were charged and then heated to 400C. After injecting 88 g of TFE, 5 ml of a solution obtained by mixing 5.36 g of IPP with 78.2 g of HCFC225cb, was injected to initiate polymerization. While maintaining the pressure to be constant (gauge pressure of 0.66 MPa), the polymerization was continued. As the polymerization rate decreased, the above solution of IPP was further added to continue the polymerization. The total amount of IPP added was 1.6 g. When 80 g of TFE was introduced, the heating was stopped, and TFE was purged to terminate the polymerization. The obtained solution was poured into HCFCl$_{41}$b for flocculation, followed by washing, filtration and drying to obtain 152 g of a white polymer.

The polymer was a TFE/PPVE copolymer wherein the ratio of the repeating units based on TFE to the repeating units based on PPVE was 72:28, by molar ratio. Further, the polymer was elastomeric at room temperature.

Preparation of a (TFE/PPVE copolymer)-(TFE/PSVE Copolymer) Block Copolymer

Into an autoclave having an internal capacity of 1 l, 80 g of the above TFE/PPVE copolymer was introduced, and after being degassed, 778.5 g of PSVE was charged, followed by heating to 40° C. and stirring for 30 minutes for dissolution. After injecting 60 g of TFE, 6 ml of a solution obtained by mixing 2.8 g of IPP with 78.6 g of HCFC225cb, was injected to initiate polymerization.

While maintaining the pressure to be constant (gauge pressure of 0.49 MPa), the polymerization was continued. As the polymerization rate decreased, the above solution of IPP was further added to continue the polymerization. The total amount of IPP added was 1.17 g. When 55 g of TFE was introduced, the heating was stopped, and TFE was purged to terminate the polymerization. The obtained solution was poured into HCFCl$_{41}$b for flocculation, followed by washing, filtration and drying to obtain 268.5 g of a white polymer (hereinafter referred to as polymer 1). The molar ratio of TFE to PSVE was 70.5:29.5.

In FIG. 1, the respective GPC charts of the initially obtained TFE/PPVE copolymer and polymer 1 obtained as described above, are shown by a solid line and a dotted line, respectively. The abscissa represents the elution time, and the ordinate represents the peak intensity. The peak of polymer 1 appears as a single peak on the higher molecular weight side than the TFE/PPVE copolymer, which indicates that no substantial blend polymer is present. Further, the respective $^{19}$F-NMR charts of the TFE/PPVE copolymer in perfluorobenzene and the above polymer 1 in the same solvent are shown in FIG. 2(a) and FIG. 2(b), respectively. The abscissa represents the chemical shift with reference to CCl$_3$F, and the ordinate represents the peak intensity. The same applies to FIGS. 3 to 5. From these data, polymer 1 was confirmed to be a (TFE/PPVE copolymer)-(TFE/PSVE copolymer)block polymer.

EXAMPLE 2

Preparation of a (PBVE)-(TFE/PSVE copolymer)block polymer

Synthesis of PBVE Segments

Into a 500 ml glass flask, 2.77 g of F(CF$_2$)$_4$I, 203 g of 1H-perfluorohexane (hereinafter referred to as C$_6$F$_{13}$H) and ~200 g of BVE were put, stirred and heated to 40° C. under nitrogen. Then, 0.33 g of IPP was added thereto to initiate polymerization. As the polymerization rate decreased, a solution obtained by mixing 1.0 g of IPP with 9.0 g of C$_6$F$_{13}$H, was added to continue the polymerization. Upon expiration of 97 hours from the initiation of the polymerization, heating was stopped. The total amount of IPP added was 0.66 g. This reaction solution was poured into HCFCl$_{41}$b for flocculation, followed by washing, filtration and drying to obtain 137 g of an amorphous polymer.

Preparation of a (PBVE)-(TFE/PSVE copolymer)block polymer

Into an autoclave having an internal capacity of 1 l, 80 g of the polymer obtained as described above, was charged and degassed, and 778.5 g of PSVE was charged, followed by heating to 40° C. and stirring for 30 minutes. Then, after injecting 58 g of TFE, 5 ml of a solution obtained by dissolving 2.63 g of IPP in 78.2 g of HCFC225cb, was injected to initiate polymerization. While maintaining the pressure to be constant, the polymerization was continued. As the polymerization rate decreased, the above IPP solution was supplemented to continue the polymerization. The total amount of IPP added was 1.05 g. When 55 g of TFE was introduced, the heating was stopped, and TFE was purged to terminate the polymerization. The obtained solution was poured into HCFCl$_{41}$b for flocculation, followed by washing, filtration and drying to obtain 217 g of a white polymer (hereinafter referred to as polymer 2). The molar ratio of TFE to PSVE was 72.1:27.9. The respective $^{19}$F-NMR charts of PBVE in perfluorobenzene and the above polymer 2 in the same solvent are shown in FIG. 3(a) and FIG. 3(b), respectively.

EXAMPLE 3

Preparation of a (TFE/PSVE copolymer)-(PBVE)-(TFE/PSVE Copolymer)Block Polymer

Synthesis of PBVE Segments

Into a 500 ml glass flask, 5.71 g of 1,4-diiodoperfluorobutane (I(CF$_2$)$_4$I), 150 g of C$_6$F$_{13}$H and 152 g of BVE were put, stirred and heated to 400C under nitrogen. Then, 3.34 g of a solution obtained by dissolving 2.29 g of IPP in 12.65 g of HCFC225cb, was added thereto, and polymerization was carried out at 40° C. for 117 hours. This reaction solution was poured into HCFCl$_{41}$b for flocculation, followed by washing, filtration and drying to obtain 153 g of an amorphous resin.

Preparation of a (TFE/PSVE copolymer)-(PBVE)-(TFE/PSVE Copolymer)Block Polymer

Into an autoclave having an internal capacity of 1 l. 80 g of the above PBVE was introduced and degassed. Then, 778.5 g of PSVE was introduced, followed by heating to 40° C. and stirring for 30 minutes for dissolution. After injecting 60 g of TFE, 7 ml of a solution obtained by dissolving 2.8 g of IPP in 78.2 g of HCFC225cb, was injected to initiate polymerization. While maintaining the pressure to be constant (gauge pressure of 0.49 MPa), the polymerization was continued. As the polymerization rate decreased, the above IPP solution was further added to continue the polymerization. The total amount of IPP added was 1.23 g. When 53 g of TFE was introduced, heating was stopped, and TFE was purged to terminate the polymerization. The obtained solution was poured into HCFCl41b for flocculation, followed by washing, filtration and drying to obtain 265 g of a white polymer (hereinafter referred to as polymer 3). The molar ratio of TFE to PSVE was 70.1:29.9. The respective $^{19}$F-NMR charts of PBVE in perfluorobenzene and the above polymer 3 in the same solvent are shown in FIG. 4(a) and FIG. 4(b), respectively.

EXAMPLE 4

Preparation of a (PBVE)-(TFE/PSVE copolymer)-(PBVE)Block Polymer

Synthesis of TFE/PSVE Copolymer Segments

Into a degassed autoclave having an internal capacity of 1 l, 4.15 g of $I(CF_2)_{41}$ and 778.5 of PSVE were charged and then heated to 40° C. After injecting 58 g of TFE, 6 ml of a solution obtained by dissolving 7.53 g of IPP in 78.2 g of HCFC225cb, was injected to initiate polymerization. While maintaining the pressure to be constant (gauge pressure of 0.45 MPa), the polymerization was continued. As the polymerization rate decreased, the above IPP solution was further added to continue the polymerization. The total amount of IPP added, was 1.66 g. When 80 g of TFE was introduced, the heating was stopped, and TFE was purged to terminate the polymerization. The obtained solution was poured into $HCFCl_{41}b$ for flocculation, followed by washing, filtration and drying to obtain 235 g of a polymer which was elastomeric.at room temperature. The molar ratio of TFE to PSVE was 72.1:27.9.

Preparation of a (PBVE)-(TFE/PSVE copolymer)-(PBVE) Block Polymer

Into a 500 ml glass flask, 50 g of the above TFE/PSVE copolymer, 250 g of $C_6F_{13}H$ and 30 g of BVE were put, stirred, dissolved and heated to 40° C. under nitrogen. Then, 1.39 g of a solution obtained by dissolving 0.97 g of IPP in 17.26 g of HCFC225cb, was added thereto to initiate polymerization. As the polymerization rate decreased, the above IPP solution was further added to continue the polymerization. The total amount of IPP added was 0.15 g. Upon expiration of 366 hours from the initiation of the polymerization, the heating was stopped. This reaction solution was poured into $HCFCl_{41}b$ for flocculation, followed by washing, filtration and drying to obtain 71.5 g of a white polymer (hereinafter referred to as polymer 4). The respective $^{19}$F-NMR charts of TFE/PSVE in perfluorobenzene and the above polymer 4 in the same solvent are shown in FIG. 5(a) and FIG. 5(b), respectively.

EXAMPLE 5

Preparation of a (PPDD)-(TFE/PSVE copolymer)-(PPDD)Block Polymer

Into a 500 ml glass flask, 50 g of the TFE/PSVE copolymer obtained in Example 4, 250 g of $C_6F_{13}H$ and 25 g of PDD were put and stirred to dissolve the TFE/PSVE copolymer. Then, a solution prepared by dissolving 0.082 μg of IPP in 5 g of $C_6F_{13}H$, was added thereto, and polymerization was carried out at 30° C. for 65 hours under nitrogen. This reaction solution was poured into $HCFCl_{41}b$ for flocculation, followed by washing, filtration and drying to obtain 62.9 g of a white polymer.

Conversion of the Polymer to an Acid Form and to a Solution

The polymer obtained in Example 1 ((TFE/PPVE copolymer)-(TFE/PSVE copolymer)block polymer) was heat-treated overnight in air at 250° C. 20.1 g of this polymer and an aqueous solution prepared by dissolving 30.2 g of dimethylsulfoxide and 13.2 g of KOH in 59.2 g of water, were added to a separable flask, heated to 70° C. and stirred. 16 Hours later, the polymer was subjected to filtration and washing with water and again returned to a separable flask, and 60 g of water was supplemented, followed by heating and stirring at 600C for 3 hours. Such an operation was repeated twice, whereupon it was confirmed that the pH became at most 8.

The solution thus obtained was subjected to filtration, and the polymer was returned to a separable flask, and 60 g of sulfuric acid of 0.5 mol/Q was added, followed by heating and stirring for 16 hours at 60° C.

The polymer was subjected to filtration, then washed with water and returned to a separable flask, and 60 g of water was added, followed by heating and stirring at 60° C. for 3 hours. This heating and stirring after the addition of sulfuric acid, washing with water and heating and stirring after the addition of water, were repeated twice, whereupon it was confirmed that the pH after completion of the operation was at least 4.

The polymer was air-dried at 60° C. for 16 hours, then dried in vacuo at 600C for 16 hours.

10 g of the above polymer and 40 g of ethanol were mixed, followed by heating and stirring at 700C for 24 hours to obtain a bluish white semitransparent viscous polymer solution having a concentration of 20% (mass ratio). To 20 g of this solution, 20 g of ethanol was added, followed by stirring for a while. The copolymer solution having a concentration of 10% thus prepared (hereinafter referred to as the solution 1) was turbid. Further, a polymer solution having a concentration of 10% (hereinafter referred to as the solution 2) prepared in the same manner by adding 20 g of HCFC225cb to 20 g of the above polymer solution having a concentration of 20%, was colorless transparent. From the solutions 1 and 2 different in the solvent, thus obtained, cast films were prepared respectively and observed by a transmission electron microscope, whereby in each cast film, a phase separation structure was confirmed.

Measurement of Water Content

Using block polymers prepared in Examples 1 to 5, the same operation as described in the "Conversion of the polymer to an acid form and to a solution" was carried out to obtain the respective acid forms, and in the same manner as the preparation of solution 2, polymer solutions (solvent: a solvent mixture of ethanol with HCFC225cb) were prepared.

The solutions were cast to form films, followed by heating at 160° C. for 30 minutes. In this manner, polymer films of Examples 1 to 5 were prepared respectively.

Such a film was immersed in deionized water at 90° C. for 16 hours and then, the mass was measured. Then, the film was vacuum-dried at 110° C. for 16 hours and then, the mass was again measured. The water content was obtained by the formula: water content (%)=100×(a-b)/b, where a is the mass (g) of the former, and b is the mass (g) of the latter. The results are shown in Table 2.

Preparation of a Fuel Cell and Evaluation of the Performance (1) A fuel Cell Employing the Block Polymer Obtained in Example 1

A platinum-supporting carbon was mixed with the solution 2 so that the mass ratio of the copolymer to the platinum-supporting carbon would be 3:7, to form a coating fluid, and the coating fluid was coated on a carbon cloth and dried to obtain a gas diffusion electrode having a gas diffusion electrode layer to have a thickness of 10 μm and an amount of supported platinum of 0.5 mg/cm$^2$.

On the other hand, the TFE/PSVE copolymer (ion exchange capacity: 1.1 meq/g dry resin) was extruded to form a film, followed by hydrolysis, conversion to an acid form and washing with water, to obtain a membrane made of a perfluoropolymer having sulfonic groups and having a thickness of 50 μm. This membrane was sandwiched between two sheets of the above gas diffusion electrode, followed by pressing by means of a flat plate pressing machine and further by heat pressing to obtain a membrane/electrode assembly.

A fuel cell having an effective membrane area of 9 cm$^2$ was assembled by disposing a current collector made of titanium outside this membrane/electrode assembly, a gas supply chamber made of PTFE outside the current collector and a heater outside the gas supply chamber.

While maintaining the temperature of the fuel cell at 80° C., oxygen was supplied to the cathode, and hydrogen was supplied to the anode, respectively, under a pressure of 0.05 MPa. The terminal voltage was measured at a current density of 1 A/cm$^2$, whereby the terminal voltage was 0.63 V. In this state, operation was continued for 1,000 hours, and the terminal voltage after 1,000 hours, was 0.62 V.

(2) Fuel Cell Employing the Block Polymer Obtained in Example 5

Using the polymer obtained in Example 5 (the (PPDD)-(TFE-PSVE copolymer)-(PPDD)block polymer), the same operation as disclosed in the "Conversion of the polymer to an acid form and to a solution" to convert it to an acid form, and in the same manner as in the preparation of solution 2 except that 1H-perfluorohexane was used instead of HCFC225cb, a polymer solution having a concentration of 10% (solution 3) was obtained.

A fuel cell was prepared in the same manner as in (1) except that the solution 3 was used instead of the solution 2, and evaluation of the performance was carried out in the same manner as in (1). The terminal voltage at a current density of 1 A/cm$^2$ was 0.65 V, and in this state, operation was continued for 1,000 hours, whereupon the terminal voltage was 0.64 V.

EXAMPLE 6 (COMPARATIVE EXAMPLE)

A fuel cell was prepared in the same manner as in Example 1 except that the gas diffusion electrode was prepared by using the TFE/PSVE copolymer (ion exchange capacity: 1.1 meq/g dry resin) instead of the polymer prepared in Example 1, and the performance of the fuel cell was evaluated in the same manner as in Example 1. At 80° C., the terminal voltage at a current density of 1 A/cm$^2$ was 0.60 V, and the terminal voltage after 1,000 hours was 0.50 V.

Further, using a solution obtained by dissolving the above TFE/PSVE copolymer in ethanol in a concentration of 10% by mass ratio, a film was formed by casting in the same manner as described in the "Measurement of water content", and the water content of the film thus obtained was measured. The result is shown in Table 2.

As shown in Table 2, the block polymers of the present invention have water contents higher than the conventional ion exchange resin of Comparative Example having an equal or higher ion exchange capacity.

TABLE 1

|  | Type | A | B | Ion exchange capacity A | Polymer | Molecular weight A | B | Polymer |
|---|---|---|---|---|---|---|---|---|
| Ex. 1 | AB type | TFE/PSVE copolymer | TFE/PPVE copolymer | 1.46 | 1.01 | 27,400 | 12,200 | 39,600 |
| Ex. 2 | AB type | TFE/PSVE copolymer | PBVE | 1.42 | 0.94 | 27,100 | 13,900 | 41,000 |
| Ex. 3 | ABA type | TFE/PSVE copolymer | PBVE | 1.47 | 1.02 | 20,400 | 9,000 | 29,400 |
| EX. 4 | BAB type | TFE/PSVE copolymer | PBVE | 1.42 | 1.07 | 14,500 | 4,700 | 19,200 |
| Ex. 5 | BAB type | TFE/PSVE copolymer | PPDD | 1.42 | 0.99 | 14,500 | 6,300 | 20,900 |

TABLE 2

|  | Ion exchange capacity | Water content (%) |
|---|---|---|
| Ex. 1 | 1.01 | 145 |
| Ex. 2 | 0.94 | 130 |
| Ex. 3 | 1.02 | 127 |
| EX. 4 | 1.07 | 133 |
| Ex. 5 | 0.99 | 76 |
| Ex. 6 | 1.1 | 72 |

The cathode resin in the present invention has a structure wherein a perfluoropolymer phase (segments A, preferably segments C) having sulfonic groups having a high ion exchange capacity and a perfluoropolymer phase (segments B, preferably segments D or segments E) having no ion exchange groups and having water repellency, are introduced at the same time, and the respective phases are separated, and thus it has a high water content and water repellency. Especially when it contains segments made of a polymer having an alicyclic structure, it is excellent also in the oxygen gas permeability. Accordingly, a polymer electrolyte fuel cell of the present invention having a cathode comprising such a cathode resin and a catalyst, has a high output density and is free from flooding, whereby the high performance can be maintained even when it is used for a long period of time.

Further, the block polymer of the present invention is useful not only as a cathode resin but also for a membrane-form polymer electrolyte for a fuel cell. Further, it is useful for various applications such as an ion exchange membrane e.g. for chlor-alkali electrolysis, a selective permeable membrane, a moisture-removing membrane, a sensor, an acid catalyst for chemical reaction, a polymer electrolyte, etc.

The entire disclosure of Japanese Patent Application JP2000-36941 filed on Feb. 15, 2000 and JP2000-351817 filed on Nov. 17, 2000 including specification, claims, drawings and summary are incorporated herein by reference in its entirety.

What is claimed is:

1. A process for producing a polymer, which comprises polymerizing a first monomer group comprising one or more fluoromonomers in the presence of a first radical initiator and an iodine-containing fluoro-compound in a non-aqueous medium or in the absence of any solvent, to prepare a substantially amorphous polymer, and then, polymerizing a second monomer group comprising one or more monomers different from the first monomer group in the presence of the polymer and a second radical initiator in a non-aqueous medium or in the absence of any solvent.

2. The process for producing a polymer according to claim 1, wherein the second monomer group comprises fluoromonomers, and the polymer obtained after thepolymerization of the second monomer group is substantially amorphous.

3. The process for producing a polymer according to claim 1, wherein one of the first monomer group and the second monomer group is the following monomer group c and the other is the following monomer group d:

Monomer group c: a perfluorovinyl ether having a —$SO_2X'$ group (wherein X' is a fluorine atom or a chlorine atom) and tetrafluoroethylene; and Monomer group d: a perfluoromonomer having no ion exchange groups and having an alicyclic structure, or a perfluoromonomer having no ion exchange groups and having an alicyclic structure and at least one other perfluoromonomer having no ion exchange groups:

4. The process for producing a polymer according to claim 1, wherein one of the first monomer group and the second monomer group is the following monomer group c and the other is the following monomer group d':

Monomer group c: a perfluorovinyl ether having a —$SO_2X'$ group (wherein X' is a fluorine atom or a chlorine atom) and tetrafluoroethylene; and Monomer group d': a perfluoromonomer having no ion exchange groups and having two double bonds to be cyclopolymerized, or a perfluoromonomer having no ion exchange groups and having two double bonds to be cyclopolymerized and at least one other perfluoromonomer having no ion exchange groups.

5. The process for producing a polymer according to claim 1, wherein one of the first monomer group and the second monomer group is the following monomer group c and the other is the following monomer group e:

Monomer group c: a perfluorovinyl ether having a —$SO_2X'$ group (wherein X' is a fluorine atom or a chlorine atom) and tetrafluoroethylene; and Monomer group e: a perfluoro(alkyl vinyl ether) having no ion exchange groups and tetrafluoroethylene.

6. The process for producing a polymer according to claim 2, wherein one of the first monomer group and the second monomer group is the following monomer group c and the other is the following monomer group d:

Monomer group c: a perfluorovinyl ether having a —$SO_2X'$ group (wherein X' is a fluorine atom or a chlorine atom) and tetrafluoroethylene; and Monomer group d: a perfluoromonomer having no ion exchange groups and having an alicyclic structure, or a perfluoromonomer having no ion exchange groups and having an alicyclic structure and at least one other perfluoromonomer having no ion exchange groups.

7. The process for producing a polymer according to claim 2, wherein one of the first monomer group and the second monomer group is the following monomer group c and the other is the following monomer group d':

Monomer group c: a perfluorovinyl ether having a —$SO_2X'$ group (wherein X' is a fluorine atom or a chlorine atom) and tetrafluoroethylene; and Monomer group d': a perfluoromonomer having no ion exchange groups and having two double bonds to be cyclopolymerized, or a perfluoromonomer having no ion exchange groups and having two double bonds to be copolymerized and at least one other perfluoromonomer having no ion exchange groups.

8. The process for producing a polymer according to claim 2, wherein one of the first monomer group and the second monomer group is the following monomer group c and the other is the following monomer group e:

Monomer group c: a perfluorovinyl ether having a —$SO_2X'$ group (wherein X' is a fluorine atom or a chlorine atom) and tetrafluoroethylene; and Monomer group e: a perfluoro(alkyl vinyl ether) having no ion exchange groups and tetrafluoroethylene.

9. The process for producing a polymer according to claim 1, wherein the iodine-containing fluoro-compound is a perfluoroalkyl monoiodide.

* * * * *